Patented Oct. 2, 1945

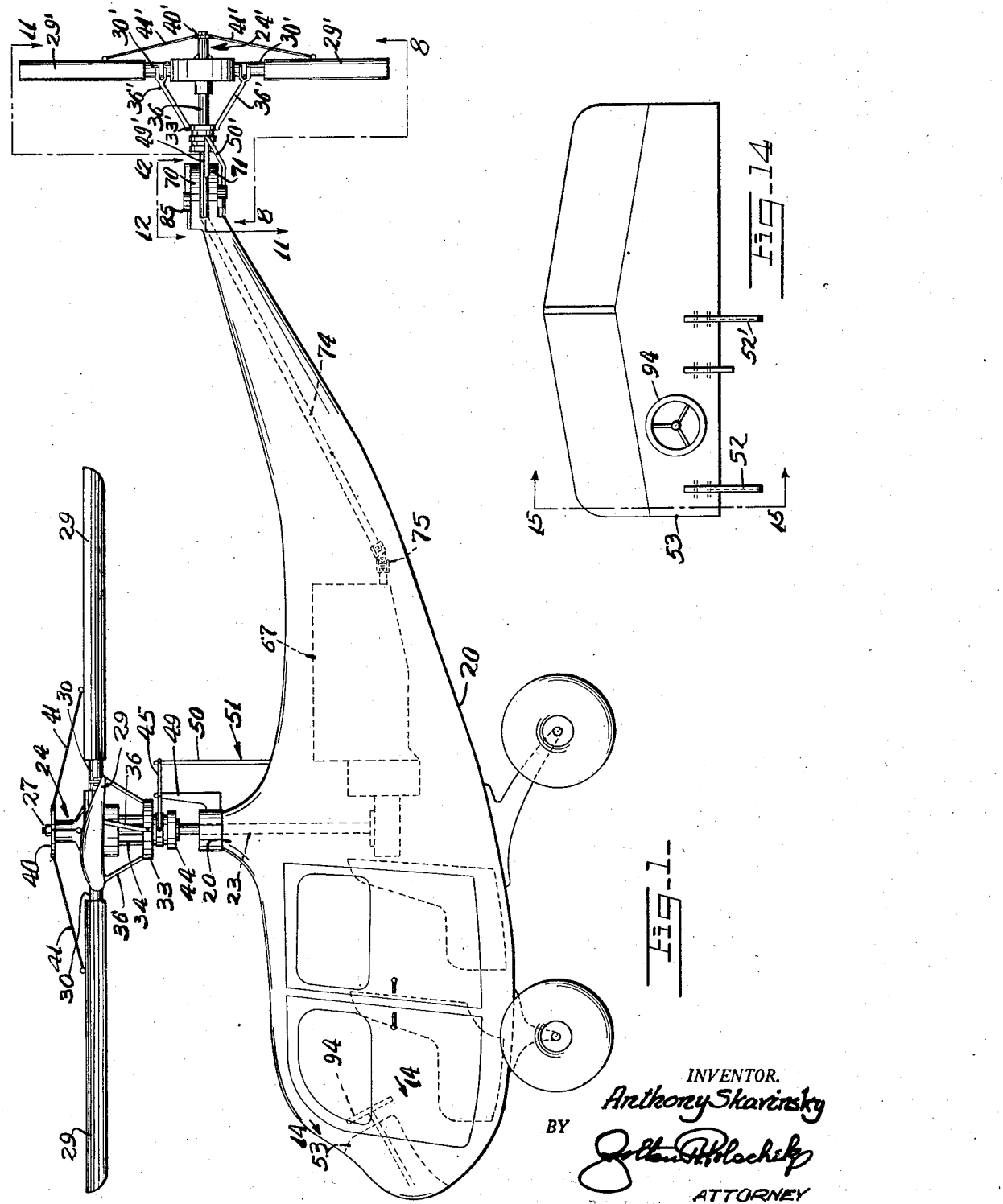

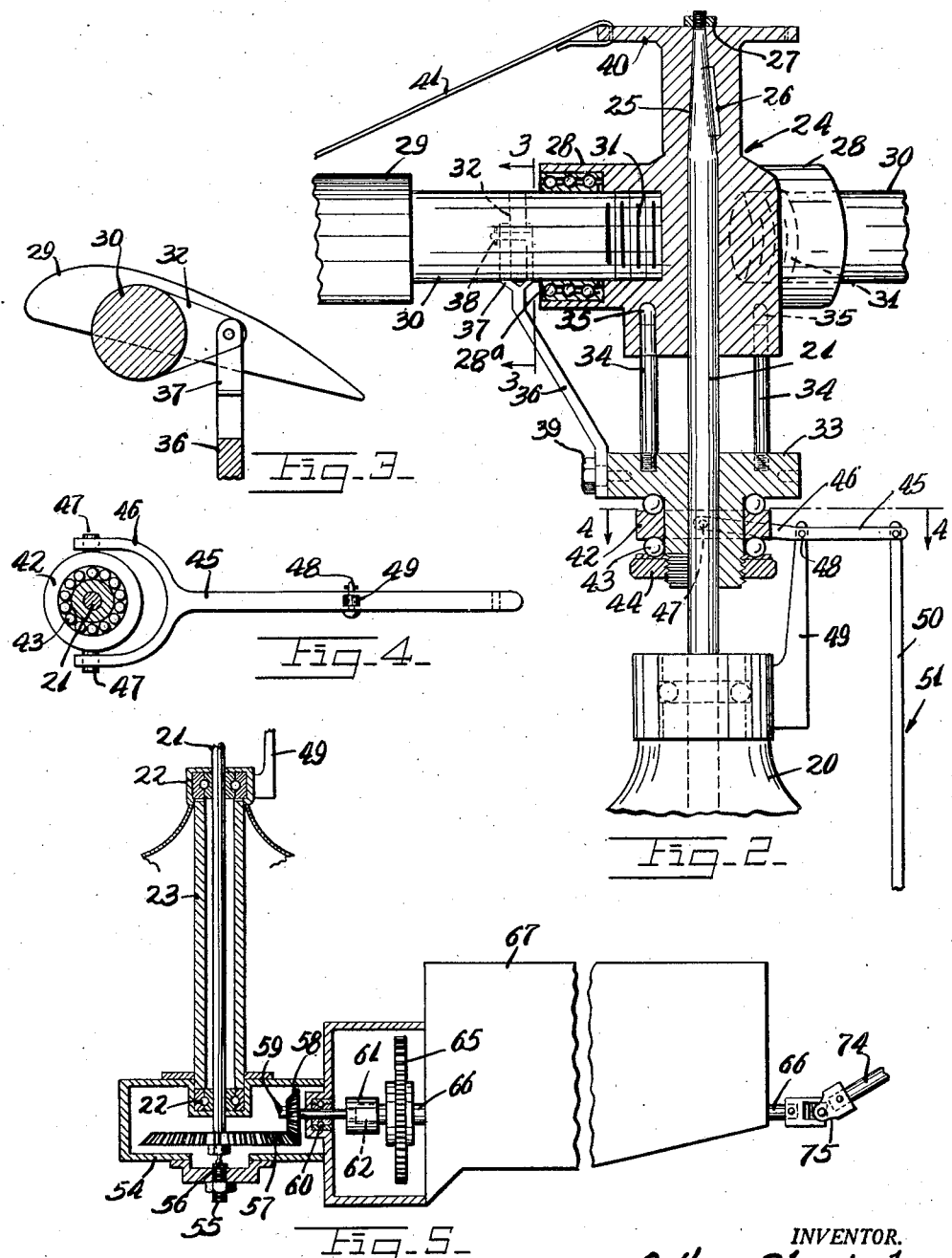

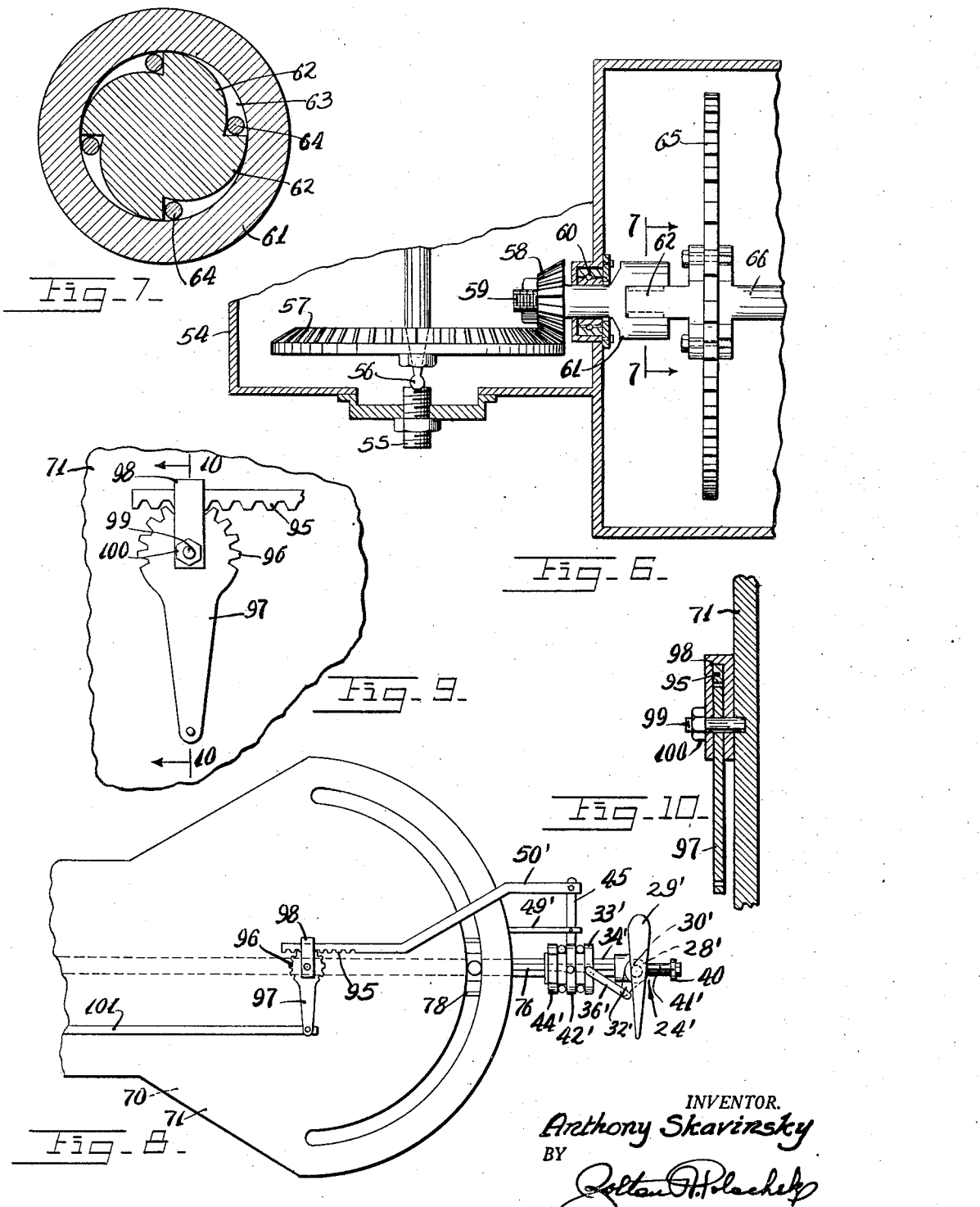

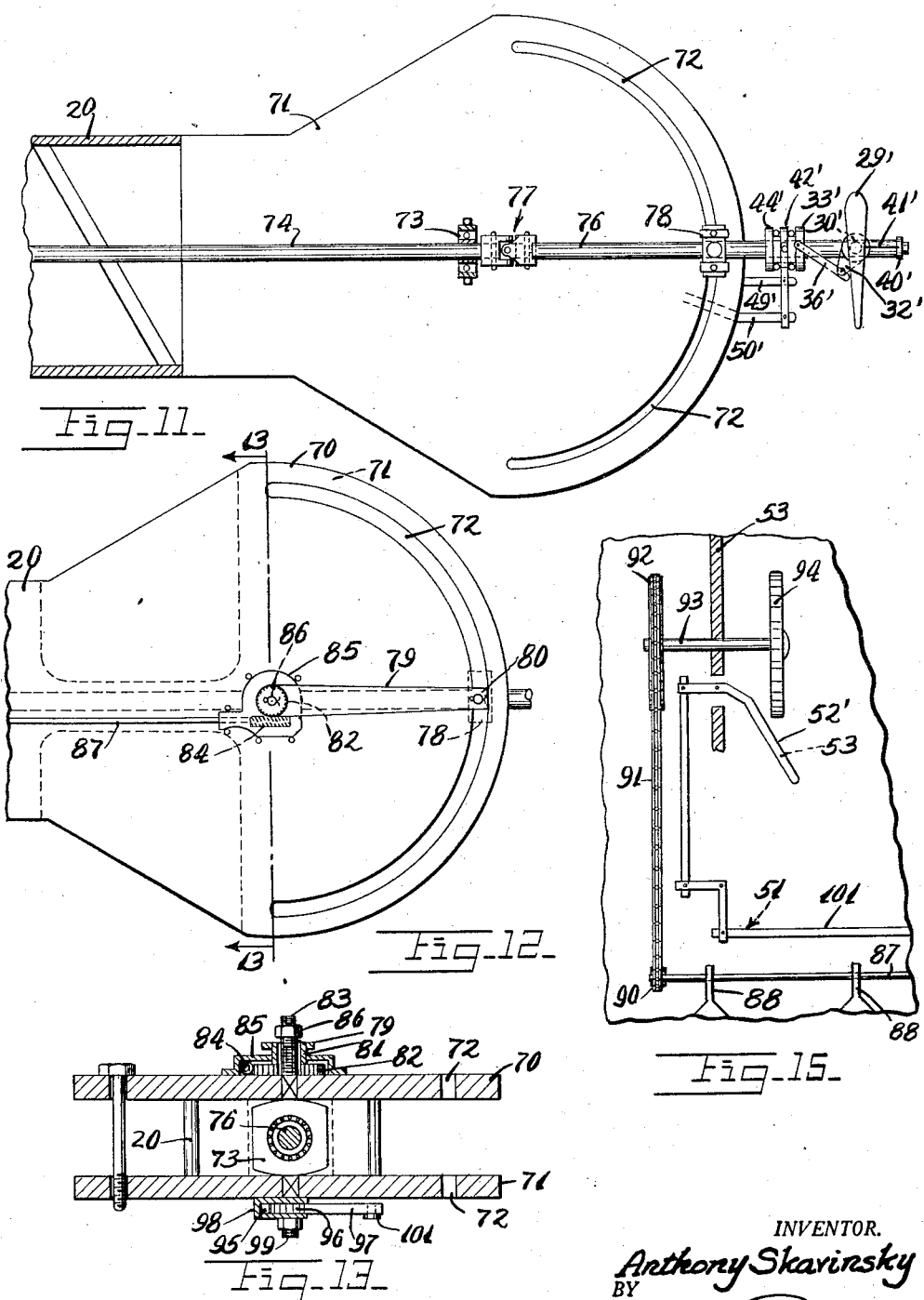

2,385,889

UNITED STATES PATENT OFFICE 2,385,889

HELICOPTER

Anthony Skavinsky, Bronx, N. Y.

Application September 18, 1943, Serial No. 502,889

4 Claims. (Cl. 244—51)

This invention relates to new and useful improvements in a helicopter.

More specifically, the new invention contemplates an improved helicopter which is characterized by an improved overhead propeller operating mechanism and an improved tail propeller operating mechanism.

Insofar as the improved overhead propeller is concerned, it is proposed to provide a vertical overhead shaft rotatively supported on and projecting from the body of the helicopter. It is proposed to fixedly mount a hub on the top of this shaft. It is proposed that the hub have a plurality of horizontal sockets, preferably three. It is proposed that a propeller blade be provided for each of said sockets to be disposed radially of the hub and to have a base stud turnably engaged in the socket. A novel mechanism is contemplated for changing the pitch of the propeller blades during the operation of the propeller.

Insofar as the tail propeller is concerned, it is proposed to characterize this feature of the improved helicopter by arranging the body to have a flat horizontal tail portion including a pair of spaced top and bottom walls having superimposed arcuate slots. It is proposed that these slots be arranged concentric and rearwards of their centers in relation to said spaced walls. It is proposed to locate a bearing between said walls and to slidably mount the bearing in said slots. It is contemplated that a stud shaft be rotatively engaged through the bearing and be pivotal about a point corresponding with the centers of said slots. A novel drive is proposed for driving said shaft. A novel means is also contemplated for mounting and operating a variable pitch propeller upon said shaft.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a helicopter constructed in accordance with this invention.

Fig. 2 is a fragmentary enlarged detailed sectional view of the upper portion of Fig. 1 showing specifically details of the overhead propeller.

Fig. 3 is a fragmentary sectional view taken on the line 3—3 of Fig. 2.

Fig. 4 is a fragmentary horizontal sectional view taken on the line 4—4 of Fig. 2.

Fig. 5 is a fragmentary vertical sectional view of a portion of Fig. 1 showing specifically the drive for the vertical shaft of the overhead propeller.

Fig. 6 is a fragmentary enlarged detailed view of a portion of Fig. 5.

Fig. 7 is a fragmentary sectional view taken on the line 7—7 of Fig. 6.

Fig. 8 is a fragmentary enlarged detailed bottom view looking in the direction of the line 8—8 of Fig. 1.

Fig. 9 is a fragmentary enlarged detailed view of a portion of Fig. 8.

Fig. 10 is a fragmentary sectional view taken on the line 10—10 of Fig. 9.

Fig. 11 is a fragmentary sectional view taken on the line 11—11 of Fig. 1.

Fig. 12 is a fragmentary plan view looking in the direction of the line 12—12 of Fig. 1.

Fig. 13 is a fragmentary sectional view taken on the line 13—13 of Fig. 12.

Fig. 14 is an elevational view of the panel of the helicopter with some of the controls, this view being taken looking in the direction of the line 14—14 of Fig. 1.

Fig. 15 is a fragmentary sectional view taken on the line 15—15 of Fig. 14.

The improved helicopter, in accordance with this invention, includes a body 20 which may be of any shape and design. While one particular shape and design is shown this is merely by way of illustration. A vertical overhead shaft 21 is rotatively supported on and projects from the body 20. This shaft 21 is supported by several ball bearings 22 located at the end of a vertical tube 23. A hub 24 is fixedly mounted upon the top of the shaft 21. Said shaft 21 is formed with a top tapered portion 25 provided with a key 26, which engages a corresponding keyway within the hub 24. A nut 27 is threadedly engaged on the extremity of said shaft 21 for securely holding the hub 24 in position. The hub 24 is provided with a plurality of horizontal sockets 28, preferably three in number.

A propeller blade 29 is provided for each socket 28. These propeller blades 29 are disposed radially of the hub 24. Each propeller blade 29 is provided with a base stud 30 which turnably engages one of said sockets 28 in a ball bearing 28ª. More particularly, each base stud 30 has a threaded end section 31 which threadedly engages the socket 28. A radial arm 32 projects from each base stud 30. A collar 33 is slidably mounted upon the vertical shaft 21 and is nonrotatively connected with the hub 24. This is accomplished by several guide rods 34 mounted upon the collar 33 and slidably engaging in openings 35 formed in the hub 24.

Connecting rods 36 extend between the collar 33 and the radial arms 32. More specifically, the upper ends of the connecting rods 36 are formed with forked portions 37 which are connected with the radial arms 32 by the pintles 38. The bottom ends of the connecting rods 36 are pivotally connected with the collar 33 by pivotal screws 39. The hub 24 is provided with a top flange 40. Guy rods 41 are connected with this flange 40 and with the propeller blades 29 to steady said blades 29 and assist in their support.

The collar 33 is associated with shifting means by which the pitch of the propeller blades 29 may be changed. This shifting means includes a ring 42 rotatively mounted with ball bearings 43 on the collar 33.

A nut 44 is threadedly mounted on the hub portion of the collar 43 and holds the ball bearings and ring 42 in position. A shifting lever 45 has a forked end 46 pivotally connected with a trunnion 47 on the ring 42. The shifting lever 45 is pivotally supported intermediate of its ends by a pintle 48 mounted on a support 49 which in turn is mounted on the top of the body 20. The outer end of the shifting lever 45 pivotally connects with a rod 50 of a control linkage means 51 (see Fig. 15) which includes a control handle 52 mounted on the panel 53 of the helicopter. The arrangement is such that the control handle 52 may be operated to raise or lower the rod 50 which in turn indirectly raises and lowers the collar 33 on the shaft 21. The connecting rods 36 indirectly transmit this movement to the propeller blades 29, changing their pitch.

The bottom end of the vertical shaft 21 extends into a casing 54 which is provided with a ball bearing stud 55. The bottom extremity of the shaft 21 has a spherical head 56 resting upon the bearing stud 55. A bevel gear 57 is mounted upon the bottom portion of the shaft 21 within the casing 54 and meshes with a bevel pinion 58 on a stud shaft 59. This stud shaft 59 is rotatively supported by a bearing 60. The other end of the stud shaft 59 is provided with an overriding clutch consisting of a socket 61 integral with the stud shaft 59 and engaging a stud 62. This stud 62 is formed with a plurality over riding recesses 63 provided with rollers 64. The stud 62 connects with a starter spur gear plate 65. This starter gear plate 65 is connected with the shaft 66 of a driving engine 67 which is mounted within the body 20.

The body 20 of the helicopter at the tail portion is formed with a flat horizontal tail portion including a pair of spaced top and bottom walls 70 and 71, respectively. These walls are formed with arcuate slots 72 which are concentric about a point forwards of the slots 72 and along the central axis of the helicopter. A bearing 73 is mounted between the walls 70 and 71 and is positioned slightly forwards of the center point of said slots 72. A drive shaft 74 is rotatively mounted in this bearing 73 and extends through the body 20 of the helicopter and connects with a universal joint 75 which is connected with the shaft 66 of the engine 67. A stud shaft 76 is connected by a universal joint 77 with the rear end of the shaft 74. This stud shaft 76 is rotatively mounted in a bearing 78 which is located between the walls 70 and 71 and which is slidably mounted in the slots 72. The arrangement is such that the stud shaft 76 may extend longitudinally rearwards, as for example, illustrated by the full lines in Fig. 11, or may pivot right or left to various angles about the concentric center point of the slots 72.

The bearing 78 merely moves along the slots 72 during this pivoting. Means is provided for holding the stud shaft 76 in various pivoted positions, referred to in the previous paragraph, and this means includes a steering arm 79 having its front end 80 connected with the bearing 78 through the top slot 72. This steering arm 79 is also connected with a hub 81 of a worm wheel 82 rotative on a stud 83 fixedly mounted on the top wall 70. A worm pinion 84 meshes with the worm wheel 82. A casing 85 is mounted over the stud 83, the worm wheel 82 and the worm pinion 84 is fixed upon said top wall 70. A nut 86 is mounted upon the top end of the stud 83. The worm pinion 84 is connected with a flexible shaft 87 which extends through the body 20 of the helicopter and which is rotatively supported by journals 88 near the panel 53 for the controls of the helicopter. A small gear 90 is mounted upon the shaft 87 and is engaged by a chain 91 engaging a large spur gear 92 fixed on a shaft 93 rotatively mounted through the said panel 53. A steering wheel 94 is mounted on the end of the shaft 93. The arrangement is such that when the steering wheel 94 is turned, the motion will be indirectly transmitted to correspondingly turn the said steering arm 79. This indirectly pivots said shaft 83 right or left, depending upon which way the steering wheel 94 is turned.

A hub 24' is fixedly mounted on the rear end of the shaft 76. This hub 24 has a plurality of sockets 28', preferably two in number. A propeller blade 29' is provided for each socket 28', and is disposed radially of the hub 28 and has a base stud 30' turnably engaging the socket 29'. A radial arm 32' is fixed on each stud 30'. A collar 33' is slidably mounted on the shaft 76 and is non-rotatively connected with hub 24' by rods 34'. Connecting rods 36' extend between the collar 33' and the radial arms 32'.

Means is provided for shifting the collar 33' for changing the pitch of the propeller blades 29'. This means includes a ring 42' rotatively mounted on the collar 33' and held in position with a nut 44'. A shifting lever 45' connects with the ring 42'. This shifting lever 45' is pivotally mounted upon a support 49'. Its outer end is connected with a rod 50' which extends beneath the tail wall 71. This rod is provided with rack teeth 95 meshing with a segmental gear 96 having a radial arm 97. The segmental gear 96 is held by a guide 98 which is mounted over a stud 99 projecting down from the wall 71. A nut 100 is mounted on the stud 99. The radial arm 97 connects with a control rod 101 which extends through the helicopter body 20 and which connects up with a linkage system 51' controlled by a handle 52'. This handle 52 is mounted upon the panel 53. The arrangement is such that the handle 52' may be manipulated to move the rod 101 forwards or rearwards to indirectly move the rack 95 and the shifting lever 45' which indirectly controls the pitch of the blades 29'. The hub 24' is provided with a top flange 40'. Guy wires 41' are connected from the flange 40' to the propeller blades 29' to assist in steadying and supporting the blades.

Further details of the construction and operation of the tail propeller of the helicopter will not be given in this specification as it is very similar to the construction and operation of the overhead propeller. It should be noted that corresponding parts have been given similar numerals, distinguishing merely in the fact that they have been primed. From this brief description and the detailed description of the construction and operation of the overhead propeller, it is believed that the tail propeller will be fully understood.

The operation of the new improved helicopter may be clearly understood from examining Fig. 1. The overhead propeller is used for lifting. The tail propeller is used for driving forwards and for steering. When it is shifted towards the right or the left it correspondingly steers the helicopter.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a helicopter, a body having a flat horizontal tail portion including a pair of spaced top and bottom walls having superimposed arcuate slots having concentric center points forward of said slots, a bearing located between said walls and slidably mounted on said slots, a stud shaft extending from said center points through said bearing, a drive shaft flexibly connected with said stud shaft means for holding said bearing in various positions along said slots, a hub fixedly mounted on the outer end of the said shaft and having a plurality of vertical sockets, a propeller blade for each socket disposed radially of said hub and having a base stud turnably engaging said socket, a radial arm on each of said studs, a collar slidably mounted on said vertical shaft and non-rotatively connected with said hub, connecting rods extending between said collar and radial arms, and means for shifting said collar for changing the pitch of said propeller blades, said means for holding the bearing in various positions along said slots comprising an arm extended along the outer face of one of said walls and having one of its ends connected with said bearing, and means for moving said arm to various pivoted positions, and including a worm wheel fixed upon said arm, a worm pinion meshing with said worm wheel, and means for turning said worm pinion.

2. In a helicopter a body having a flat horizontal tail portion including a pair of spaced top and bottom walls having superimposed arcuate slots having concentric center points forward of said slots, a bearing located between said walls and slidably mounted in said slots, a second bearing located between said walls and turnably supported at said concentric center points, a stud shaft rotatively supported by said bearings, a propeller mounted on the outer end of said stud shaft, a driven shaft flexibly connected with the inner end of said stud shaft, and means for holding said first bearing in various adjusted positions along the length of said slots for adjusting the angular positioning of said propeller on said tail.

3. In a helicopter a body having a flat horizontal tail portion including a pair of spaced top and bottom walls having superimposed arcuate slots having concentric center points forward of said slots, a bearing located between said walls and slidably mounted in said slots, a second bearing located between said walls and turnably supported at said concentric center points, a stud shaft rotatively supported by said bearings, a propeller mounted on the outer end of said stud shaft, a driven shaft flexibly connected with the inner end of said stud shaft, and means for holding said first bearing in various adjusted positions along the length of said slots for adjusting the angular positioning of said propeller on said tail, comprising an arm extended along the outer face of one of the walls of said tail and having its ends connected with said bearings, a worm gear mounted on said arm concentric with said second bearing, and means for turning said worm gear.

4. In a helicopter a body having a flat horizontal tail portion including a pair of spaced top and bottom walls having superimposed arcuate slots having concentric center points forward of said slots, a bearing located between said walls and slidably mounted in said slots, a second bearing located between said walls and turnably supported at said concentric center points, a stud shaft rotatively supported by said bearings, a propeller mounted on the outer end of said stud shaft, a driven shaft flexibly connected with the inner end of said stud shaft, and means for holding said first bearing in various adjusted positions along the length of said slots for adjusting the angular positioning of said propeller on said tail, comprising an arm extended along the outer face of one of the walls of said tail and having its ends connected with said bearings, a worm gear mounted on said arm concentric with said second bearing, and means for turning said worm gear, comprising a worm pinion meshing with said worm gear and a flexible shaft extending from said worm pinion, and means for manually turning said flexible shaft.

ANTHONY SKAVINSKY.